United States Patent
Sundaram

(10) Patent No.: US 10,363,516 B2
(45) Date of Patent: Jul. 30, 2019

(54) FLEXIBLE ADSORBENTS FOR LOW PRESSURE DROP GAS SEPARATIONS

(71) Applicant: ExxonMobil Research and Engineering Company, Annandale, NJ (US)

(72) Inventor: Narasimhan Sundaram, Annandale, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 135 days.

(21) Appl. No.: 15/653,770

(22) Filed: Jul. 19, 2017

(65) Prior Publication Data

US 2018/0036673 A1    Feb. 8, 2018

Related U.S. Application Data

(60) Provisional application No. 62/370,863, filed on Aug. 4, 2016.

(51) Int. Cl.
    *B01D 53/04*      (2006.01)
    *B01D 53/047*     (2006.01)
    *C10L 3/10*       (2006.01)

(52) U.S. Cl.
    CPC ....... *B01D 53/0473* (2013.01); *B01D 53/047* (2013.01); *B01D 53/0407* (2013.01);
    (Continued)

(58) Field of Classification Search
    CPC ............ B01D 53/0407; B01D 53/0415; B01D 53/047; B01D 53/0473; B01D 2253/102;
    (Continued)

(56) References Cited

U.S. PATENT DOCUMENTS 4,234,326 A * 11/1980 Bailey ............... B01D 53/0407
                                                502/423
4,770,678 A *  9/1988 Haslett, Jr. ............ B01D 46/00
                                                166/267

(Continued)

FOREIGN PATENT DOCUMENTS

| EP | 0820798 A2 | 1/1998 |
| JP | S60129116 A | 7/1985 |
| JP | 2002263436 A | 9/2002 |

OTHER PUBLICATIONS

International Search Report and Written Opinion PCT/US2017/042754 dated Nov. 7, 2017.

*Primary Examiner* — Frank M Lawrence, Jr.
(74) *Attorney, Agent, or Firm* — Andrew T. Ward; Priya G. Prasad

(57) ABSTRACT

In various aspects, apparatuses and methods are provided for low pressure drop gas separations. In PSA processes, where there are large swings in pressure and corresponding swings in fluid velocity through the adsorbent, mechanical stresses during pressure cycling are of considerable concern. When that pressure is relieved in a lower pressure portion of the cycle, the high velocity of gas moving through the adsorbent bed can erode, strip away, or otherwise damage the channels within the adsorbent. Provided herein are methods which utilize flexible boundaries between adsorbent beds that are operated out of phase with one another. The flexible boundaries permit an increase in void space through the adsorbent during high pressure stages of the cycle and a decrease in void space through the adsorbent during low pressure stages of the cycle.

15 Claims, 2 Drawing Sheets

(52) U.S. Cl.
CPC ............ B01D 53/0415 (2013.01); C10L 3/10 (2013.01); *B01D 2253/102* (2013.01); *B01D 2253/104* (2013.01); *B01D 2253/106* (2013.01); *B01D 2253/108* (2013.01); *B01D 2253/204* (2013.01); *B01D 2253/308* (2013.01); *B01D 2253/342* (2013.01); *B01D 2256/245* (2013.01); *B01D 2257/302* (2013.01); *B01D 2257/304* (2013.01); *B01D 2257/504* (2013.01); *B01D 2259/4146* (2013.01); *Y02C 10/08* (2013.01)

(58) Field of Classification Search
CPC ........ B01D 2253/104; B01D 2253/106; B01D 2253/108; B01D 2253/204; B01D 2253/308; B01D 2253/342; B01D 2256/245; B01D 2257/302; B01D 2257/304; B01D 2257/504; B01D 2259/4146; C10L 3/10; Y02C 10/08
USPC .......................... 95/96, 97; 96/121, 149, 154
See application file for complete search history.

(56) References Cited

U.S. PATENT DOCUMENTS

| | | | |
|---|---|---|---|
| 4,801,308 A | 1/1989 | Keefer | |
| 4,816,121 A | 3/1989 | Keefer | |
| 4,968,329 A | 11/1990 | Keefer | |
| 5,082,473 A | 1/1992 | Keefer | |
| 5,232,479 A | 8/1993 | Poteau et al. | |
| 5,256,172 A | 10/1993 | Keefer | |
| 6,051,050 A | 1/2000 | Keefer et al. | |
| 6,063,161 A | 5/2000 | Keefer et al. | |
| 6,197,092 B1 | 3/2001 | Butwell et al. | |
| 6,315,817 B1 | 11/2001 | Butwell et al. | |
| 6,406,523 B1 | 6/2002 | Connor et al. | |
| 6,521,019 B2 | 2/2003 | Jain et al. | |
| 6,629,525 B2 | 10/2003 | Hill et al. | |
| 6,651,658 B1 | 11/2003 | Hill et al. | |
| 6,691,702 B2 | 2/2004 | Appel et al. | |
| 6,893,482 B2 | 5/2005 | Marsden et al. | |
| 7,049,259 B1 | 5/2006 | Deckman et al. | |
| 7,108,740 B2 * | 9/2006 | Arno | B01D 53/261 55/516 |
| 7,300,905 B2 | 11/2007 | Keefer et al. | |
| 7,419,526 B2 * | 9/2008 | Greer | A62B 23/02 55/512 |
| 8,262,773 B2 | 9/2012 | Northrop et al. | |
| 2005/0211100 A1 * | 9/2005 | Doughty | B01D 53/02 96/154 |
| 2008/0148936 A1 | 6/2008 | Baksh | |
| 2008/0282884 A1 | 11/2008 | Kelley et al. | |
| 2008/0282892 A1 | 11/2008 | Kelley et al. | |
| 2009/0025553 A1 | 1/2009 | Keefer et al. | |
| 2011/0206573 A1 * | 8/2011 | Ackley | B01D 53/0431 422/218 |
| 2013/0047842 A1 | 2/2013 | Halder et al. | |
| 2014/0230445 A1 | 8/2014 | Huntington | |

\* cited by examiner

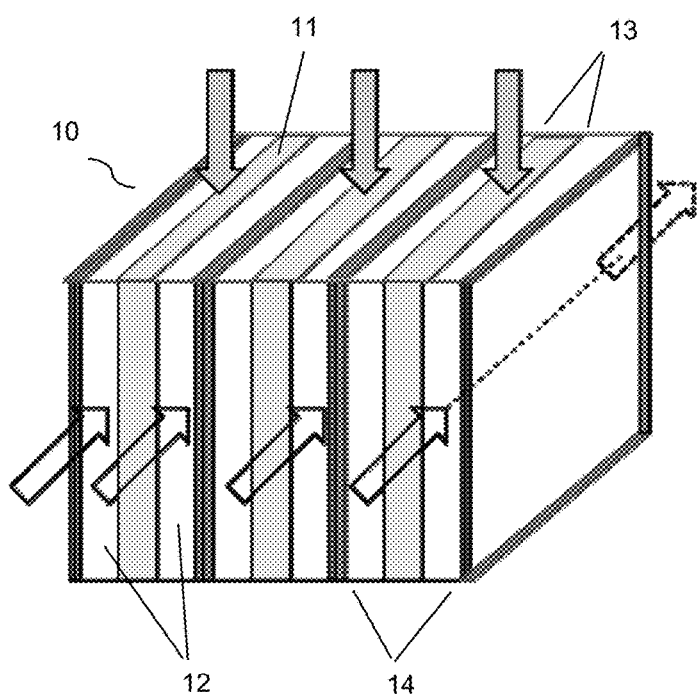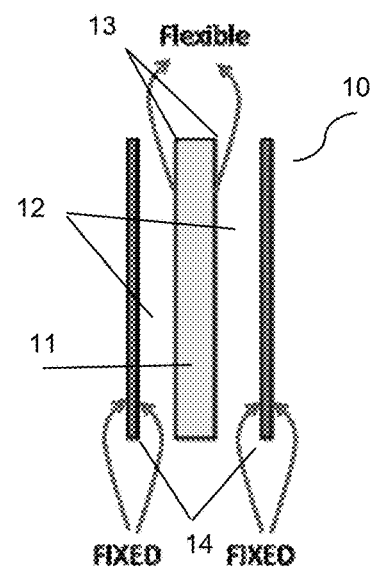
FIGURE 1A                    FIGURE 1B

FLEXIBLE ADSORBENTS FOR LOW PRESSURE DROP GAS SEPARATIONS

CROSS-REFERENCE TO RELATED APPLICATIONS

This application claims the benefit of U.S. Provisional Application No. 62/370,863, filed on Aug. 4, 2016, the entire contents of which are incorporated herein by reference.

FIELD

This invention relates to gas purification adsorbents and processes and more particularly to flexible adsorbents and processes for purifying gas streams.

BACKGROUND

Gas streams frequently require purification to remove undesirable contaminants; for example, contaminants that are frequently to be removed from gas streams include acidic compounds such as hydrogen sulfide, sulfur dioxide, and carbon dioxide. These components are frequently found in natural gas and have to be brought down to low levels before the gas can be sent through transmission pipelines; hydrogen sulfide often requires separation from gas streams produced in petroleum refining operations such as hydrotreating. Adsorptive gas separation techniques are common in various industries using solid sorbent materials such as activated charcoal or a porous solid oxide such as alumina, silica-alumina, silica, or a crystalline zeolite such as zeolite A, which can be far more economical in most cases than cryogenic separation.

Adsorptive separation may be achieved, as noted by Yang by three mechanisms, steric, equilibrium, or kinetic: R. T. Yang, *Gas Separation by Adsorption Processes*, Imperial College Press, 1997, ISBN: 1860940471, ISBN-13: 9781860940477. A large majority of processes operate through the equilibrium adsorption of the gas mixture and kinetic separations have lately attracted considerable attention with the development of functional microporous adsorbents and efficient modeling tools. Relatively few steric separation processes have been commercialized. Kinetically based separation involves differences in the diffusion rates of different components of the gas mixture and allows different species to be separated regardless of similar equilibrium adsorption parameters. Kinetic separations utilize molecular sieves as the adsorbent since they exhibit a distribution of pore sizes which allow the different gaseous species to diffuse into the adsorbent at different rates while avoiding exclusion of any component of the mixture. Kinetic separations can be used for the separation of industrial gases, for example, for the separation of nitrogen from air and argon from other gases. In the case of the nitrogen/oxygen separation (for example, oxygen and nitrogen differ in size by only 0.02 nm), the separation is efficient since the rate of transport of oxygen into the carbon sieve pore structure is markedly higher than that of nitrogen. Hence, the kinetic separation works, even though the equilibrium loading levels of oxygen and nitrogen are virtually identical.

Kinetically based separation processes may be operated, as noted in U.S. Patent Application Publication No. 2008/0282884, as pressure swing adsorption (PSA), temperature swing adsorption (TSA), partial pressure swing or displacement purge adsorption (PPSA) or as hybrid processes comprised of components of several of these processes. These swing adsorption processes can be conducted with rapid cycles, in which case they are referred to as rapid cycle thermal swing adsorption (RCTSA), rapid cycle pressure swing adsorption (RCPSA), and rapid cycle partial pressure swing or displacement purge adsorption (RCPPSA) technologies, with the term "swing adsorption" taken to include all of these processes and combinations of them.

In the case of kinetic-controlled PSA processes, the adsorption and desorption are more typically caused by cyclic pressure variation, whereas in the case of TSA, PPSA and hybrid processes, adsorption and desorption may be caused by cyclic variations in temperature, partial pressure, or combinations of pressure, temperature and partial pressure, respectively. In the exemplary case of PSA, kinetic-controlled selectivity may be determined primarily by micropore mass transfer resistance (e.g., diffusion within adsorbent particles or crystals) and/or by surface resistance (e.g., narrowed micropore entrances). For successful operation of the process, a relatively and usefully large working uptake (e.g., the amount adsorbed and desorbed during each cycle) of the first component and a relatively small working uptake of the second component may preferably be achieved. Hence, the kinetic-controlled PSA process requires operation at a suitable cyclic frequency, balancing the avoidance of excessively high cycle frequency where the first component cannot achieve a useful working uptake with excessively low frequency where both components approach equilibrium adsorption values.

Some established kinetic-controlled PSA processes use carbon molecular sieve adsorbents, e.g., for air separation with oxygen comprising the first more-adsorbed component and nitrogen the second less adsorbed component. Another example of kinetic-controlled PSA is the separation of nitrogen as the first component from methane as the second component, which may be performed over carbon molecular sieve adsorbents or more recently as a hybrid kinetic/equilibrium PSA separation (principally kinetically based, but requiring thermal regeneration periodically due to partial equilibrium adsorption of methane on the adsorbent material) over titanosilicate based adsorbents such as ETS-4 (such as disclosed in U.S. Pat. Nos. 6,197,092 and 6,315,817).

The faster the beds perform the steps required to complete a cycle, the smaller the beds can be when used to process a given hourly feed gas flow. Several other approaches to reducing cycle time in PSA processes have emerged which use rotary valve technologies as disclosed in U.S. Pat. Nos. 4,801,308; 4,816,121; 4,968,329; 5,082,473; 5,256,172; 6,051,050; 6,063,161; 6,406,523; 6,629,525; 6,651,658; and 6,691,702. A parallel channel (or parallel passage) contactor with a structured adsorbent may be used to allow for efficient mass transfer in these rapid cycle pressure swing adsorption processes. Approaches to constructing parallel passage contactors with structured adsorbents have been disclosed such as in U.S. Patent Application Publication No. 2008/0282892.

Traditionally, adsorptive separation processes use packed beds of adsorbent particulates. However, the traditional packed beds are not likely to meet the very stringent requirements for natural gas cleanup. The use of adsorbent monoliths provides one approach to designing an adsorbent bed that has low pressure drop, good flow distribution, and low dispersion. Monoliths have very low flow tortuosity and can also be engineered for almost any user specified void volume to meet a specified pressure drop. Other monolith advantages include avoidance of bed fluidization or lifting. While offering these advantages, the monoliths can also have some disadvantages. These include, (i) lack of lateral flow communication between axial flow channels which prevents self correction of any flow maldistribution, (ii) a likely more pronounced effect of obstructive fouling on flow distribution, (iii) potential thermal and mechanical stresses during pressure and thermal cycling, (iv) wall effects leading to flow leakage near the wall, (v) difficult and expensive to manufacture, (vi) difficult to apply a consistent and mechanically stable adsorbent coating within the monolith channels, and (vii) difficult loading/unloading of the monolith in the containment vessel (as compared to loose particle beds) leading to a longer turnaround time.

In PSA processes, where there are large swings in pressure and corresponding swings in fluid velocity through the adsorbent, mechanical stresses during pressure cycling are of considerable concern. That is, during higher pressure portions of the cycle, there is a large pressure drop across the adsorbent bed. When that pressure is relieved in a lower portion of the cycle, the high velocity of gas moving through the adsorbent bed can erode, strip away, or otherwise damage the channels within the adsorbent. What is needed in the industry is a new manner in which to design, fabricate and/or load adsorbents beds which have process benefits of structured adsorbent beds, such as monoliths, but solve the problems associated with high pressure drops across traditional adsorbent monoliths.

SUMMARY

An adsorbent module and associate processes are provided. In one aspect, the adsorbent module comprises; a first adsorbent bed and a second adsorbent bed designed to receive a first feed gas; a third adsorbent bed designed to receive a second feed gas disposed between the first adsorbent bed and the second adsorbent bed; wherein the third adsorbent bed shares a first flexible boundary with the first adsorbent bed and a second flexible boundary with the second adsorbent bed; wherein the first adsorbent bed and second adsorbent beds, respectively, have a first and second rigid boundary opposite the first and second flexible boundary. The adsorbent beds may be made of the same or different adsorbent materials. In one aspect, the adsorbent beds are the same thickness. In another aspect, the first, second, and third adsorbent beds are structured monoliths or particulate beds. In yet another aspect, the first and second flexible boundaries deform to permit a void space reduction of between 10 and 50% in any of the first, second, or third adsorbent beds In another aspect, the adsorbent module is configured to receive a feed flow such that the first and second adsorbent bed are designed to receive the first feed gas in a first direction and the third adsorbent bed is designed to receive the second feed gas in a second direction; the second direction being substantially orthogonal to the first.

Also provided are methods for adsorption using the flexible boundaries adsorbent module describe above. In one aspect, the method includes providing a first adsorbent bed and a second adsorbent bed; providing a third adsorbent bed disposed between the first adsorbent bed and the second adsorbent bed; wherein the third adsorbent bed shares a first flexible boundary with the first adsorbent bed and a second flexible boundary with the second adsorbent bed; wherein the first adsorbent bed and second adsorbent beds, respectively, have a first and second rigid boundary opposite the first and second flexible boundary; feeding the first adsorbent bed and the second adsorbent bed with a feed gas comprising a contaminant gas and a product gas at a feed pressure of 10 bara (1.0 MPaa) to 40 bara (4.0 MPaa); adsorbing the contaminant gas onto the first and second adsorbent beds to produce an effluent stream with a higher concentration of the product gas and a lower concentration of the contaminant gas than the feed gas; reducing the pressure in the first and second adsorbent beds to a pressure from about 1.0 bara (about 0.1 MPaa) to about 4.0 bara (about 0.4 MPaa); purging the first and second adsorbent beds with a purge stream to produce a purge stream comprising a higher concentration of the contaminant gas and a lower concentration of the product gas than the feed gas; and repressurizing the first and second adsorbent beds to a pressure of 10 bara (1.0 MPaa) to 40 bara (4.0 MPaa); wherein at the conclusion of the feeding, adsorbing, and repressurizing acts, the third adsorbent bed is at a lower pressure than the first and second adsorbent beds; and wherein at the conclusion of the reducing and purging acts, the third adsorbent bed is at a higher pressure than the first and second adsorbent beds.

In another aspect, the method further comprises feeding the third adsorbent bed with a second feed gas comprising a second contaminant gas and a second product gas at a feed pressure of 10 bara (1.0 MPaa) to 40 bara (4.0 MPaa); adsorbing the second contaminant gas onto the third adsorbent bed to produce an effluent stream with a higher concentration of the second product gas and a lower concentration of the second contaminant gas than the second feed gas; reducing the pressure in the third adsorbent bed to a pressure from about 1.0 bara (about 0.1 MPaa) to about 4.0 bara (about 0.4 MPaa); purging the third adsorbent bed with a purge stream to produce a purge stream comprising a higher concentration of the second contaminant gas and a lower concentration of the second product gas than the second feed gas; and repressurizing the third adsorbent bed to a pressure of 10 bara (1.0 MPaa) to 40 bara (4.0 MPaa); wherein the feeding, adsorbing, reducing, and purging of the third adsorbent bed occur out of phase with the feeding, adsorbing, reducing, and purging of the first and second adsorbent beds.

In certain aspects, the feed gas and second feed gas are the same; the contaminant gas and the second contaminant gas are the same; and the product gas and the second product gas are the same. In an additional aspect, the direction of feeding the first and second adsorbent beds is orthogonal to the direction of feeding the third adsorbent bed.

In other aspects, feeding of the first and second adsorbent beds permits a decrease in void space of the third adsorbent bed of 10-50% by virtue of deformation of the first and second flexible boundary. Relatedly, in certain aspects feeding the third adsorbent bed permits a decrease in void space in the first and second adsorbent beds of 5-25% per bed.

BRIEF DESCRIPTION OF THE DRAWINGS

FIG. 1A is a simplified isometric view of an adsorbent module containing cross flow adsorbent beds according to the present disclosure.

FIG. 1B shows a simplified cross-sectional view of one portion of the adsorbent module in FIG. 1A.

DETAILED DESCRIPTION OF THE EMBODIMENTS

General Considerations

Figure 2:
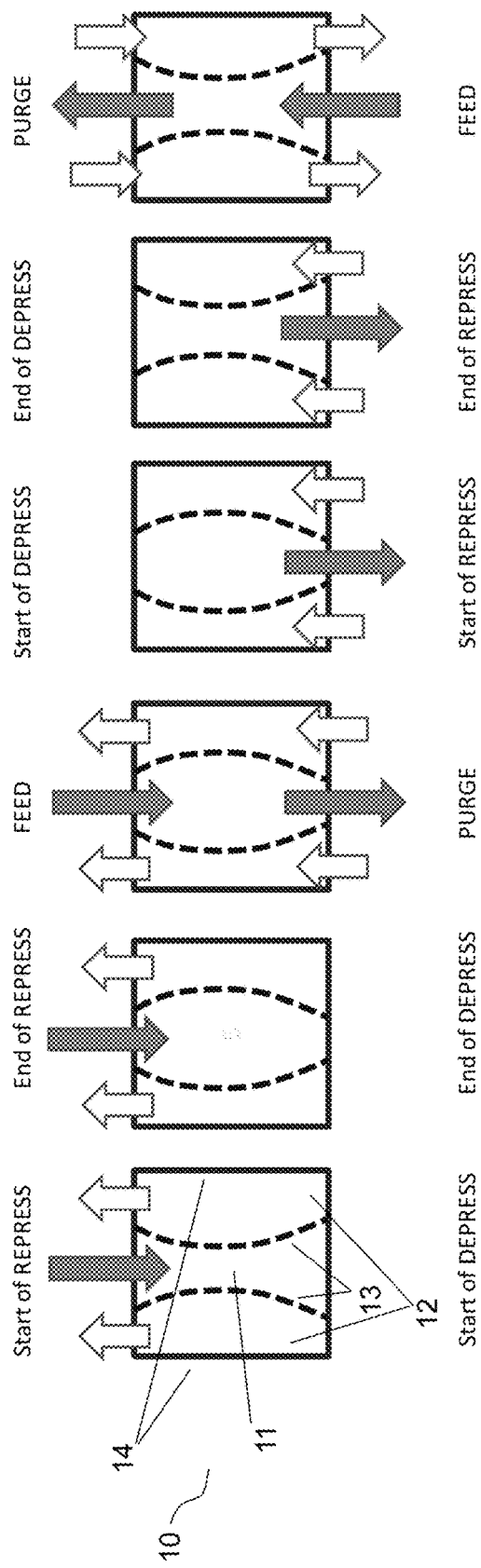
FIG. 2 depicts a simplified adsorption cycle using an embodiment of the adsorbent module presently disclosed.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

Monolith adsorbent contactors are defined herein is a subset of adsorbent contactors comprising structured (engineered) adsorbents in which substantially parallel flow channels are incorporated into the adsorbent structure. These flow channels may be formed by a variety of means, including extruded ceramic monoliths, bundles of hollow fibers, spiral wound adsorbent layers, stacked layers of adsorbent sheets with and without spacers, stacking plates and/or modules and other methods. In addition to the adsorbent material, the structure may contain items such as, but not limited to, support materials, heat sink materials, void reduction components, and other materials. Exemplary contactors are described in U.S. Patent App. Pub. No. 2008/0282892, which is incorporated by reference herein.

The present disclosure has an objective of improving heat and mass transfer within the adsorbent bed and additionally or alternately reducing the mechanical stresses applied to the channels of the adsorbent bed.

Bed Configuration

With reference to FIGS. 1A and 1B adsorption module 10 comprises adsorbent beds 11 and 12 arranged in layers such that adsorbent bed 11 is sandwiched between two of adsorbent bed 12. This layered pattern can be repeated throughout the vessel containing the adsorption module. Adsorbent beds 11 and 12 can be made of the same or different adsorbent material. Adsorbent bed 11 is bound defined on either side by flexible boundary 13. Flexible boundary(ies) 13 is(are) a shared boundary between adsorbent beds 11 and 12. The boundary of adsorbent bed 12 that is not shared with adsorbent bed 11 is(are) fixed boundary(ies) 14. As shown in FIG. 1A, feed flow through adsorbent bed 11 can be in an orthogonal direction to the feed flow in adsorbent bed 12.

Flexible boundary 13 is designed such that it will deform and/or displace based on pressure changes associated with different phases of the adsorption/desorption process. For example, when adsorbent bed 11 is in a high pressure phase of the adsorption process, flexible boundaries 13 are permitted to deform and/or displace outward toward the respective rigid boundary 14, thereby decreasing the void space in associated adsorbent beds 12. Likewise, when adsorbent bed 12 is in a high pressure phase of the adsorption process, flexible boundaries 13 are permitted to deform and/or displace inward toward the centerline of adsorbent bed 11, thereby decreasing the void space in associated adsorbent bed 11. This flexibility increases void space during high pressure operations and decreases void space during low pressure operations, thereby decreasing the pressure drop across adsorbent beds during high pressure phases of the adsorption process. Accordingly, flexible boundary 13 enables each of adsorbent beds 11 and 12 to see lower stresses, which will lead to longer adsorbent life and improved adsorbent performance.

Adsorbent

The adsorbent material can be selected according to the service needs, particularly the composition of the incoming gas stream, the contaminants which are to be removed and the desired service conditions, e.g., incoming gas pressure and temperature, desired product composition and pressure. Non-limiting examples of selective adsorbent materials can include, but are not limited to, microporous materials such as zeolites, metal organic frameworks, AlPOs, SAPOs, ZIFs, (Zeolitic Imidazolate Framework based molecular sieves, such as ZIF-7, ZIF-8, ZIF-22, etc.), and carbons, as well as mesoporous materials such as amine-functionalized MCM materials, and combinations and intergrowths thereof. For the acidic gases, such as hydrogen sulfide and carbon dioxide, typically found in natural gas streams, adsorbent such as cationic zeolites, amine-functionalized mesoporous materials, stannosilicates, carbons, and combinations/intergrowths thereof can be suitable.

The adsorbent can be in the form of individual particles (such as zeolite crystals) bound together to form a coating, a mixed matrix film containing the adsorbent particles, a porous layer having a sorbent (absorbent or adsorbent) in the pore structure, or a reasonably contiguous film of adsorbent material, as well as a combination of these structures. Non-limiting examples of mixed matrix films can include, but are not limited to, polymer films such as silicone rubber, polyimide films containing particles of zeolites such as DDR, CHA, MFI, Beta, FAU, and/or combinations or intergrowths thereof, and the like. Mixed matrix films on the exterior of the core can additionally or alternately contain pore/void structures. Examples of void structures can include voids between the polymer adsorbent particles, while pore structures can typically comprise interconnected pore networks. Examples of reasonably contiguous films of adsorbent materials can include crystalline adsorbent materials that are intergrown to form a film of adsorbent crystals, films of amorphous adsorbent materials, and the like. Intergrown films of adsorbent crystals can include zeolite films of DDR, MFI, and/or CHA grown on the exterior surface of the core. These films can additionally or alternately contain voids/pore networks. Examples of a porous layer having an adsorbent in the pore structure can include porous alumina with an ionic liquid imbibed into the pore structure. Examples of a porous layer having an adsorbent in the pore structure can include porous alumina with small zeolite particles packed/bound into the pore structure.

Examples of suitable coating methods can include fluid phase coating techniques, such as slurry coating, slip coating, hydrothermal film formation, hydrothermal coating conversion, and hydrothermal growth. When non-hydrothermal coating techniques are used, the coating solutions can typically include the adsorbent and a viscosifying agent, such as polyvinyl alcohol, and optionally a heat transfer solid and a binder. The heat transfer solid may not be needed in situations where the core of the particle can act as its own heat sink, e.g., by storing and releasing heat in the different steps of the separation process cycle. If a viscosifying agent, such as polyvinyl alcohol, is used, it can usually burn away when the coating is cured, e.g., in a kiln. Binders such as colloidal silica and/or alumina may be used to increase the mechanical strength of the fired coating. If the adsorbent includes a microporous, mesoporous, and/or macroporous component, this can typically occupy from about 20 to about 60% (e.g., from about 20% to about 40%) of the volume of the cured coating. To reduce the void volume of coatings containing such components, a blocking agent can be applied in a separate coating process. When hydrothermal film formation methods are chosen to apply the adsorbent layer, the coating techniques used can be very similar to the way in which zeolite membranes are prepared. An example of a method for growing a zeolite layer is described in U.S. Pat. No. 7,049,259, to which specific reference is made herein for incorporation of a description of such a method. Zeolite layers grown by hydrothermal synthesis on supports can often have cracks and grain boundaries that are mesoporous and/or macroporous in size. The volume of these pores can often be less than about 10 vol % of the film thickness, and there can often be a characteristic distance, or gap, between cracks. Thus, as-grown films can often be used directly as an adsorbent layer without the need for a blocking agent.

When the adsorbent coating is in the form of individual bound particles, the particles of the adsorbent material may be coated onto the core particles from a liquid e.g., a suspension or solution, and/or can be adhered to the particles, e.g., by physical attraction. One method for preparing a coating of individual bound particles can be to wash coat the particles onto the core. The wash coat can include binder particles that do not act as adsorbents.

When the adsorbent coating is a mixed matrix film containing adsorbent particles, it can be deposited on the cores from a slurry containing a solvent, polymer, and zeolite(s) can be coated onto the surface of the core in a variety of fluid bed, and spray drying and extrusion processes. In these processes the solvent can advantageously evaporate, leaving the mixed matrix polymer and zeolite film.

If the structured adsorbent is a porous layer having an adsorbent in the pore structure, a porous inorganic oxide film can be formed on the surface of the core, and an adsorbent liquid can be imbibed into the pore structure and/or adsorbent particles can be packed/coated into the pore structure. In imbibing situations, it can be preferred for the oxide film to be chosen so that the liquid film readily invades (i.e., wets the inside of) the pore structure. It can additionally or alternately be preferred that that the size of the pore structure can be selected to hold the liquid in place by capillary action. In coating/packing situations, coating techniques such as dry powered coating, slurry casting, and/or wash coating can be used to place adsorbent particles in the pore structure.

When the adsorbent is an intergrown film of adsorbent crystals, the coating can be produced by hydrothermal and/or solvothermal synthesis. For example, films of intergrown DDR (as well as MFI) crystals can readily be produced by hydrothermal synthesis. When the adsorbent is a film of an amorphous adsorbent material, it may be solution coated onto the core and/or formed on the core by a chemical reaction.

If the adsorbent particles are loaded into an ordered array in the adsorbent vessel, it can be preferred to have the gas channels/passages in the particles substantially aligned, running substantially parallel to the direction of gas flow in the vessel, e.g., radially/axially as described above; this can be particularly important for units operating on a rapid swing cycle to improve/maximize gas flux rates. The substantially aligned gas channels/passages may not be required to be completely continuous, but rather a relatively high level of order can be maintained at the macroscopic level in the orientations of the particles; it is not essential that the gas channels of one particle lead directly into the next longitudinally adjacent particle nor that the gas channels/passages be exactly aligned but that, taken as a whole, the bed can advantageously generally display this high level of order in the particle orientations.

Flexible Boundary

Flexible boundaries can be constructed from flexible materials including metallic and non-metallic materials or alloys or even ceramic or fiberglass based fabrics or combinations of these.

Tensile and ductile materials are also suitable. These materials deployed as sheets for example can be tethered or attached to other vessel boundaries along contours that are preferably rigid so that the deformation is controlled and reversible based on the pressure variations on each side of the boundary. The materials chosen enable the deformation of the boundary to occur in a uniform manner, i.e. not in waves or ripples. The materials are also flexible over wide range of temperatures including as high as 400 to 500° C.

Process

FIG. 2 depicts a simplified adsorption cycle using an embodiment of the adsorbent module presently disclosed. Typical pressure swing adsorption cycles include four basic steps: (1) contacting the adsorbent bed with a feed gas containing a at least one contaminant gas and at least one product gas at a higher pressure to adsorb the contaminant gas onto the adsorbent; (2) reducing the pressure in the adsorbent bed to desorb the adsorbed contaminant gas; (3) purging the adsorbent bed to remove the contaminant gas from the adsorbent bed at the lower pressure, thereby regenerating the bed for a subsequent cycle; and (4) repressurizing the adsorbent bed to the feed gas pressure to prepare for the contacting step described above.

As described above, where there are large swings in pressure and corresponding swings in fluid velocity through the adsorbent, mechanical stresses during pressure cycling are of considerable concern. These stresses can be mitigated by reducing the pressure drop across the adsorbent bed. Pressure drop can be effected by a variety of factors, one of which is void space within the adsorbent. As used herein, "void space" or "voidage" is defined as the ratio of the volume available for fluid flow compared to the overall volume of the adsorbent bed. As void space increases, pressure drop decreases—that is, gases can flow more freely when there is a larger volume of voidage through which to flow. The flexible boundaries 13, described above, allow for an increase in void space during high pressure portions of a PSA cycle, when pressure drop is most concerning, and a decrease in void space during low pressure portions of a PSA cycle, when pressure drop is not as concerning.

FIG. 2 depicts simplified steps of a typical cycle afforded by the current disclosure. From left to right, adsorbent beds 12 are shown at the conclusion of a feeding step wherein a contaminant has been adsorbed onto adsorbent beds 12. Adsorbent beds 12 are about to begin a depressurization to desorb the adsorbed contaminant. Adsorbent bed 11 is shown at the conclusion of a purge step and ready to be repressurized. As shown, flexible boundaries 13 are permitted to deform inward thereby increasing the void space in adsorbent beds 12 during a high pressure step and decreasing the void space in adsorbent bed 11 during a low pressure step. The next illustration to the right shows adsorbent bed 11 at the conclusion of its repressurization step and adsorbent beds 12 at the conclusion of their depressurization step. Flexible boundaries are permitted to deform outward thereby increasing the void space in adsorbent bed 11 during a high pressure step and decreasing the void space in adsorbent beds 12 during a low pressure step. Feed gas is then admitted to adsorbent bed 11 at high pressure, while purge gas is admitted to adsorbent beds 12 at low pressure. At the conclusion of the feeding step adsorbent bed 11 begins its depressurization to desorb the adsorbed contaminant. Conversely, adsorbent bed 12 begins it repressurization in preparation to receive the feed gas. As pressure increases adsorbent beds 12 and decreases in adsorbent bed 11, flexible boundaries 13 are permitted to deform inward thereby increasing the void space in adsorbent beds 12 and decreasing the void space in adsorbent bed 11. Once repressurized, adsorbent beds 12 receive a feed gas, while depressurized adsorbent bed 11 receives a purge gas. Throughout the cycle, fixed boundaries 14 remain fixed and do not deform High pressures during the high pressure steps, such as repressurizing and feeding, are generally between about 10 bara (1.0 MPaa) to 40 bara (4.0 MPaa) inclusive. Low pressures during the low pressure steps, such as depressurizing and purging, are generally between about 1.0 bara (about 0.1 MPaa) to about 4.0 bara (about 0.4 MPaa), inclusive. Pressures can be reduced via blowdown or equalization with another adsorption module or any other pressure reducing mechanism commonly known in the art.

Satisfactory void space ratios during high pressure steps, such as repressurizing and feeding, will generally be from 0.4 to 0.7, e.g. 0.45 to 0.65, e.g. 0.45 to 0.6, 0.45 to 0.55, e.g. 0.5 to 0.55. Satisfactory void space rations during low pressure steps, such as depressurizing and purging, will generally be from 0.25 to 0.55, e.g. 0.3 to 0.5, e.g. 0.3 to 0.45, 0.3 to 0.4, e.g. 0.3 to 0.35. Put another way, a satisfactory void space reduction from a high pressure step to a low pressure step will generally be from 1 to 65%, e.g. from 10 to 50%, from 15 to 40%, from 20 to 30%.

Prophetic Example

Below is a simplified example proving the concept that manipulation of void space can serve to reduce pressure drop in an adsorbent bed. In a publication titled *Optimum structured adsorbents for gas separation processes* by F. Rezaei and P. Webley, CHEM. ENG'G SCI., 64 (2009), 5182-91, parameters that govern performance of adsorption structures are summarized for a laminate structure, as well as other structures. A laminated unit structure is one consisting typically of two parallel plates which are coated with adsorbent and which form a channel through which fluid can pass. Multiple such laminated unit structures can be further assembled and stacked as needed. Voidage, which is a measure of the volume available for fluid flow compared to the overall volume of the laminate, is governed by the gap between the plates and the thickness of the plate. FIGS. 1A and 1B can be imagined to depict three stacked laminate structures for the purposes of this proof of concept, although it is understood that the disclosed adsorbent module need not be composed of laminate structures.

An exemplary illustration of the invention is now made using the principal performance parameters for a laminate structure which are pressure drop, mass transfer coefficient and surface area. These parameters are calculated using the formulae given in the Rezaei and Webley publication, noted above, for typical conditions and laminate channel dimensions. The conclusions reached apply to the other structures, and thus, should not be considered limiting. Table 1 shows performance of laminate adsorbents for varying voidage as related to pressure drop. Pressure drop is a measure of the energy required to maintain proper flow during a particular step of the cyclic process. When the pressure drop is greater than about 1 bar, the process becomes hydraulically limited. Thus, an adsorber module which possesses flexible boundaries that allow the voidage of laminate structures to vary during the cycle, permits a cyclic process to be conducted such that pressure drop is maintained below this threshold value of about 1 bar.

As can be seen during feeding, as void space decreases, pressure drop increases rapidly. Indeed, as soon as void space reaches 0.41 an unacceptable pressure drop of 1.96 bar is exhibited across the adsorbent. The purge portions of the cycle present different concerns. Specifically, pressure does not become a concern until much lower voidages, e.g. a voidage of 0.29, but at higher void space ratios mass transfer rate during the purge step is somewhat unsatisfactory.

The current invention promotes a synergistic outcome through the use of flexible boundaries to manipulate void space. For example, feeding with a void space of 0.47 yields a satisfactory pressure drop of 1.03 bar. A purge with the same void space, however, provides a satisfactory pressure drop of 0.21 bar but a less than optimal mass transfer coefficient of 772. The flexible boundary can permit a decreased voidage during the purge step, e.g. a voidage of 0.33, which yields a satisfactory pressure drop of 0.95 and a likewise satisfactory mass transfer coefficient of 1133—an increase in mass transfer coefficient of greater than 30%.

TABLE 1

Performance of laminate adsorbents for varying voidage

| voidage | step | velocity, m/s | pressure drop, bar | Mass transfer coefficient, 1/s | surface area, 1/m |
|---|---|---|---|---|---|
| 0.50 | feed | 1.00 | 0.79 | 963 | 5000 |
| 0.47 | feed | 1.00 | 1.03 | 1070 | 5263 |
| 0.44 | feed | 1.00 | 1.39 | 1203 | 5556 |
| 0.41 | feed | 1.00 | 1.96 | 1374 | 5882 |
| 0.38 | feed | 1.00 | 2.93 | 1600 | 6250 |
| 0.33 | feed | 1.00 | 4.75 | 1914 | 6667 |
| 0.29 | feed | 1.00 | 8.66 | 2380 | 7143 |
| 0.23 | feed | 1.00 | 19.07 | 3142 | 7692 |
| 0.50 | purge | 0.20 | 0.16 | 715 | 5000 |
| 0.47 | purge | 0.20 | 0.21 | 772 | 5263 |
| 0.44 | purge | 0.20 | 0.28 | 839 | 5556 |
| 0.41 | purge | 0.20 | 0.39 | 919 | 5882 |
| 0.38 | purge | 0.20 | 0.59 | 1015 | 6250 |
| 0.33 | purge | 0.20 | 0.95 | 1133 | 6667 |
| 0.29 | purge | 0.20 | 1.73 | 1282 | 7143 |
| 0.23 | purge | 0.20 | 3.81 | 1474 | 7692 |

Additionally or alternately, the invention can comprise one or more of the following embodiments.

Embodiment 1

An adsorbent module within an adsorption vessel comprising: a first adsorbent bed and a second adsorbent bed designed to receive a first feed gas; a third adsorbent bed designed to receive a second feed gas disposed between the first adsorbent bed and the second adsorbent bed; wherein the third adsorbent bed shares a first flexible boundary with the first adsorbent bed and a second flexible boundary with the second adsorbent bed; wherein the first adsorbent bed and second adsorbent beds, respectively, have a first and second rigid boundary opposite the first and second flexible boundary.

Embodiment 2

The adsorbent module of embodiment 1, wherein the first and second adsorbent bed are designed to receive the first feed gas in a first direction and the third adsorbent bed is designed to receive the second feed gas in a second direction; the second direction being substantially orthogonal to the first.

Embodiment 3

The adsorbent module of any of the previous embodiments, wherein the first, second, and third adsorbent beds comprise a same adsorbent material.

Embodiment 4

The adsorbent module of any of the previous embodiments, wherein the first, second, and third adsorbent beds are structured monoliths.

Embodiment 5

The adsorbent module of any of the previous embodiments, wherein the first, second, and third adsorbent beds are the same thickness.

Embodiment 6

The adsorbent module of any of the previous embodiments, wherein the first and second flexible boundaries deform to permit a void space reduction of between 10 and 50% in any of the first, second, or third adsorbent beds.

Embodiment 7

A cyclical pressure swing adsorption process comprising; providing a first adsorbent bed and a second adsorbent bed; providing a third adsorbent bed disposed between the first adsorbent bed and the second adsorbent bed; wherein the third adsorbent bed shares a first flexible boundary with the first adsorbent bed and a second flexible boundary with the second adsorbent bed; wherein the first adsorbent bed and second adsorbent beds, respectively, have a first and second rigid boundary opposite the first and second flexible boundary; feeding the first adsorbent bed and the second adsorbent bed with a feed gas comprising a contaminant gas and a product gas at a feed pressure of 10 bara (1.0 MPaa) to 40 bara (4.0 MPaa); adsorbing the contaminant gas onto the first and second adsorbent beds to produce an effluent stream with a higher concentration of the product gas and a lower concentration of the contaminant gas than the feed gas; reducing the pressure in the first and second adsorbent beds to a pressure from about 1.0 bara (about 0.1 MPaa) to about 4.0 bara (about 0.4 MPaa); purging the first and second adsorbent beds with a purge stream to produce a purge stream comprising a higher concentration of the contaminant gas and a lower concentration of the product gas than the feed gas; and repressurizing the first and second adsorbent beds to a pressure of 10 bara (1.0 MPaa) to 40 bara (4.0 MPaa); wherein at the conclusion of the feeding, adsorbing, and repressurizing acts, the third adsorbent bed is at a lower pressure than the first and second adsorbent beds; and wherein at the conclusion of the reducing and purging acts, the third adsorbent bed is at a higher pressure than the first and second adsorbent beds.

Embodiment 8

The process of embodiment 7, further comprising feeding the third adsorbent bed with a second feed gas comprising a second contaminant gas and a second product gas at a feed pressure of 10 bara (1.0 MPaa) to 40 bara (4.0 MPaa); adsorbing the second contaminant gas onto the third adsorbent bed to produce an effluent stream with a higher concentration of the second product gas and a lower concentration of the second contaminant gas than the second feed gas; reducing the pressure in the third adsorbent bed to a pressure from about 1.0 bara (about 0.1 MPaa) to about 4.0 bara (about 0.4 MPaa); purging the third adsorbent bed with a purge stream to produce a purge stream comprising a higher concentration of the second contaminant gas and a lower concentration of the second product gas than the second feed gas; and repressurizing the third adsorbent bed to a pressure of 10 bara (1.0 MPaa) to 40 bara (4.0 MPaa); wherein the feeding, adsorbing, reducing, and purging of the third adsorbent bed occur out of phase with the feeding, adsorbing, reducing, and purging of the first and second adsorbent beds.

Embodiment 9

The process of embodiment 8, wherein the feed gas and second feed gas are the same; wherein the contaminant gas and the second contaminant gas are the same; and wherein the product gas and the second product gas are the same.

Embodiment 10

The process of embodiment 8 or 9, wherein the direction of feeding the first and second adsorbent beds is orthogonal to the direction of feeding the third adsorbent bed.

Embodiment 11

The process of embodiments 7-10, wherein during feeding the first and second adsorbent beds, the void space in the third adsorbent bed is decreased by 10-50% by virtue of deformation of the first and second flexible boundary.

Embodiment 15

The process of embodiments 7-10, wherein during feeding the third adsorbent bed, the void space in the first and second adsorbent beds is decreased by 5-25% per bed.

The invention claimed is:

1. An adsorbent module for use within an adsorption vessel comprising:
   a first adsorbent bed and a second adsorbent bed designed to receive a first feed gas;
   a third adsorbent bed designed to receive a second feed gas disposed between the first adsorbent bed and the second adsorbent bed;
   wherein the third adsorbent bed shares a first flexible boundary with the first adsorbent bed and a second flexible boundary with the second adsorbent bed;
   wherein the first adsorbent bed and second adsorbent beds, respectively, have a first and second rigid boundary opposite the first and second flexible boundary.

2. The adsorbent module of claim 1, wherein the first and second adsorbent bed are designed to receive the first feed gas in a first direction and the third adsorbent bed is designed to receive the second feed gas in a second direction; the second direction being substantially orthogonal to the first.

3. The adsorbent module of claim 1, wherein the first, second, and third adsorbent beds comprise a same adsorbent material.

4. The adsorbent module of claim 1, wherein the first, second, and third adsorbent beds are structured monoliths.

5. The adsorbent module of claim 1, wherein the first, second, and third adsorbent beds are the same thickness.

6. The adsorbent module of claim 1, wherein the first and second flexible boundaries deform to permit a void space reduction of between 10 and 50% in any of the first, second, or third adsorbent beds.

7. A cyclical pressure swing adsorption process comprising;
providing a first adsorbent bed and a second adsorbent bed;
providing a third adsorbent bed disposed between the first adsorbent bed and the second adsorbent bed; wherein the third adsorbent bed shares a first flexible boundary with the first adsorbent bed and a second flexible boundary with the second adsorbent bed; wherein the first adsorbent bed and second adsorbent beds, respectively, have a first and second rigid boundary opposite the first and second flexible boundary;
feeding the first adsorbent bed and the second adsorbent bed with a feed gas comprising a contaminant gas and a product gas at a feed pressure of 10 bara (1.0 MPaa) to 40 bara (4.0 MPaa);
adsorbing the contaminant gas onto the first and second adsorbent beds to produce an effluent stream with a higher concentration of the product gas and a lower concentration of the contaminant gas than the feed gas;
reducing the pressure in the first and second adsorbent beds to a pressure from about 1.0 bara (about 0.1 MPaa) to about 4.0 bara (about 0.4 MPaa);
purging the first and second adsorbent beds with a purge stream to produce a purge stream comprising a higher concentration of the contaminant gas and a lower concentration of the product gas than the feed gas; and
repressurizing the first and second adsorbent beds to a pressure of 10 bara (1.0 MPaa) to 40 bara (4.0 MPaa);
wherein at the conclusion of the feeding, adsorbing, and repressurizing acts, the third adsorbent bed is at a lower pressure than the first and second adsorbent beds; and wherein at the conclusion of the reducing and purging acts, the third adsorbent bed is at a higher pressure than the first and second adsorbent beds.

8. The process of claim 7, further comprising
feeding the third adsorbent bed with a second feed gas comprising a second contaminant gas and a second product gas at a feed pressure of 10 bara (1.0 MPaa) to 40 bara (4.0 MPaa);
adsorbing the second contaminant gas onto the third adsorbent bed to produce an effluent stream with a higher concentration of the second product gas and a lower concentration of the second contaminant gas than the second feed gas;
reducing the pressure in the third adsorbent bed to a pressure from about 1.0 bara (about 0.1 MPaa) to about 4.0 bara (about 0.4 MPaa);
purging the third adsorbent bed with a purge stream to produce a purge stream comprising a higher concentration of the second contaminant gas and a lower concentration of the second product gas than the second feed gas; and
repressurizing the third adsorbent bed to a pressure of 10 bara (1.0 MPaa) to 40 bara (4.0 MPaa); wherein the feeding, adsorbing, reducing, and purging of the third adsorbent bed occur out of phase with the feeding, adsorbing, reducing, and purging of the first and second adsorbent beds.

9. The process of claim 8, wherein the feed gas and second feed gas are the same; wherein the contaminant gas and the second contaminant gas are the same; and wherein the product gas and the second product gas are the same.

10. The process of claim 7, wherein the first, second, and third adsorbent beds comprise a same adsorbent material.

11. The process of claim 8, wherein the direction of feeding the first and second adsorbent beds is orthogonal to the direction of feeding the third adsorbent bed.

12. The process of claim 7, wherein the first, second, and third adsorbent beds are structured monoliths.

13. The process of claim 7, wherein the first, second, and third adsorbent beds are the same thickness.

14. The process of claim 7, wherein during feeding the first and second adsorbent beds, the void space in the third adsorbent bed is decreased by 10-50% by virtue of deformation of the first and second flexible boundary.

15. The process of claim 8, wherein during feeding the third adsorbent bed, the void space in the first and second adsorbent beds is decreased by 5-25% per bed.

* * * * *